United States Patent Office 3,345,400
Patented Oct. 3, 1967

3,345,400
BIPHENYLCARBOXYLATES
Constantine Emmanuel Anagnostopoulos, St. Louis, Mo., and Aubert Yaucher Coran, Charleston, W. Va., assignors to Monsanto Company, a corporation of Delaware
No Drawing. Filed Dec. 23, 1963, Ser. No. 332,917
9 Claims. (Cl. 260—469)

ABSTRACT OF THE DISCLOSURE

This disclosure covers certain substituted phenyl esters of substituted and unsubstituted biphenyl mono- and dicarboxylates as new compositions of matter. These esters are useful for the stabilization of polymeric materials against the effects of ultraviolet light.

---

The present invention relates to a new and useful class of organic compounds. More particularly, this invention is concerned with substituted phenyl esters of certain biphenyl mono- and dicarboxylic acids.

The compounds of this invention are characterized by the following formulas:

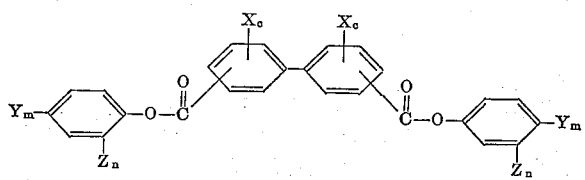

wherein:

c is an integer from zero to two;
m and n are unlike integers from zero to one;
X is selected from the group consisting of alkyl and alkoxy of one to four carbon atoms;
Y is selected from the group consisting of α-cumyl and

wherein:

R, $R_1$ and $R_2$ are each alkyl of one to twenty-one carbon atoms, and the sum of the carbon atoms in R, $R_1$ and $R_2$ is up to twenty-three; and
Z is alkoxy of one to eighteen carbon atoms;

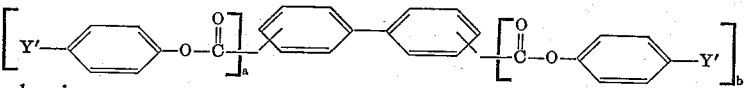

wherein:

a and b are integers from zero to one, and the sum of a+b is at least one; and
Y' is alkyl of four to twenty-four carbon atoms, such alkyl being connected to the phenyl ring by a tertiary carbon atom. The compounds of this invention also include 3-n-octadecyloxyphenyl p-phenylbenzoate.

The compounds of this invention can be prepared by reacting a halide of a biphenyl mono- or dicarboxylic acid with an appropriate substituted phenol such as a para-alkylphenol or a meta-alkoxyphenol.

Specific examples of substituted phenols which are employed in the preparation of the compounds of this invention are 4-t-butylphenol, 4-t-amylphenol, 4-(1,1,3,3-tetramethylbutyl)phenol, 4-(1-ethyl-1-methylpentyl)phenol, 4-α-cumylphenol, 3-methoxyphenol, 3-butoxyphenol, 3-octadecoxyphenol and the like. Other substituted phenols which are used are those produced by the reaction of phenol with a tertiary alkyl halide or with a mixture of such alkyl halides. Phenol is also reacted with branched chain olefins or mixtures thereof to produce the substituted phenols. The olefins which are employed are those wherein there is at least one branch on one of the carbon atoms of a double bond, as in the case of isobutylene and diisobutylene. The position of the unsaturation is generally immaterial, and one can employ alpha olefins as well as olefins in which the double bond is remotely disposed with respect to the terminal carbon atoms.

The polymers of propylene having a total number of carbon atoms of from 6 to 24, and the polymers of butylene having a total number of carbon atoms of from 8 to 24, are generally well suited for the preparation of the alkylphenols which are useful in the preparation of the compounds of this invention. For example, one can employ propylene dimer, propylene trimer, propylene tetramer, propylene pentamer, propylene hexamer, propylene octamer, isobutylene dimer, butylene trimer, butylene tetramer, butylene pentamer, etc. The alkylphenols which are derived from propylene polymers having from 6 to 24 carbon atoms are a preferred class of alkylphenols to be used in the preparation of the compounds of this invention. The propylene polymers which are used in the preparation of these alkylphenols are available commercially and, in general, boil within the range of 115° C. to 350° C. Such alkylphenols, as well as the other alkylphenols contemplated herein, can be prepared by methods well known to those skilled in the art. One method of preparing the alkylphenols from propylene polymers is described in U.S. 2,865,966. The class of alkylphenols are preferably prepared according to the methods disclosed in U.S. application Ser. No. 21,872, filed Apr. 13, 1960; U.S. application Ser. No. 44,439, filed July 21, 1960; and U.S. application Ser. No. 44,464, filed July 21, 1960.

Such terms as "propylene trimer" or "propylene tetramer," as used herein, shall be understood to refer to those hydrocarbons present in the product resulting from the polymerization of propylene. Since such a polymerization reaction does not proceed so smoothly or accurately as to yield only exact tri or tetra multiples of the propylene feed, it should be clear that these terms are meant to be descriptive of the hydrocarbons present in the polymer product and boiling respectively within the $C_9$ and $C_{12}$ olefin boiling ranges, which ranges embrace the boiling points of the various isomeric $C_9$ and $C_{12}$ polymeric hydrocarbons present therein. Such a construction should also be given to the terms used to describe the other propylene polymers and the butylene polymers. It will be understood that the alkylphenols prepared from these polymers will be predominantly those wherein the alkyl group is connected to the nucleus by a tertiary carbon atom.

The preparation of several exemplary biphenyl carboxylic acid esters of this invention is hereinafter set forth in detail. It is to be understood that such specific examples are illustrative only and should not be construed as limiting the invention in any manner.

Example 1

This example describes the preparation of bis(p-nonylphenyl)-4,4'-biphenyldicarboxylate from a $C_9$-alkylphenol, distillation range (5 mm. Hg):

| | °C. |
|---|---|
| First drop | 288 |

| 5–95% | 288–313 |
| End | 316 | whose alkyl substituent is derived from propylene trimer (boiling range 121–138° C.)

A mixture containing 5.58 grams (0.02 mol) of biphenyl-4,4'-dicarboxylic chloride, 8.82 grams (0.04 mol) of said $C_9$-alkylphenol, and 50 ml. of benzene is placed in a suitable flask. The mixture is agitated, and 0.044 mol of triethylamine is added slowly. The resulting mixture is heated to reflux and is held there for about one hour. The reaction mixture is then washed once with a dilute aqueous solution of HCl, and with distilled water, until a test shows that said mixture is neutral. The water and benzene are distilled off, and the product is filtered. There is obtained an 86% yield of bis(p-nonylphenyl)-4,4'-biphenyldicarboxylate.

*Example 2*

Following the procedure of Example 1, biphenyl-2,2'-dicarboxylic chloride is employed as the halide reactant. There is obtained a similar yield of bis(p-nonylphenyl-2,2'-biphenyldicarboxylate.

*Example 3*

Following the procedure of Example 1, the phenol reactant employed is derived from propylene pentamer (boiling range, 260–265° C.). There is obtained a similar yield of bis(p-pentadecylphenyl) - 4,4' - biphenyldicarboxylate.

The procedure described in Example 1 is repeated with the phenols and biphenyl dicarboxylic halides hereinafter set forth. The molar proportions are as previously employed, and the biphenyldicarboxylates are obtained in yields of about 85–95%.

*Example 4*

Phenol: $C_{13}$-alkylphenol derived from a propylene polymer mixture (boiling range, 200–260° C.) containing an average of 13 carbon atoms.
Halide: methylbiphenyl-4,4'-dicarboxylic chloride.
Ester: bis(p-tridecylphenyl)-methylbiphenyl - 4,4' - dicarboxylate.

*Example 5*

Phenol: $C_{18}$-alkylphenol derived from propylene hexamer (boiling range, 260–290° C.).
Halide: 4,4'-diethoxybiphenyl-2,2'-dicarboxylic chloride.
Ester: bis(p-octadecylphenyl) - 4,4' - diethoxybiphenyl-2,2'-dicarboxylate.

*Example 6*

Phenol: $C_{21}$-alkylphenol derived from a propylene polymer mixture (boiling range, 295–325° C.) containing an average of 21 carbon atoms and consisting chiefly of propylene hexamer and propylene octamer.
Halide: biphenyl-4,4'-dicarboxylic chloride.
Ester: bis(p-heneicosylphenyl) - 4,4' - biphenyldicarboxylate.

*Example 7*

A mixture containing 5.58 grams (0.02 mol) of biphenyl-4,4'-dicarboxylic chloride, 8.25 grams (0.04 mol) of 4-(1,1,3,3,-tetramethylbutyl)phenol, and 50 ml. of toluene is charged to a suitable flask. This mixture is agitated, and 0.044 mol of triethylamine is added slowly. The resulting mixture is heated to reflux and is held there for about one hour. The reaction mixture is then washed once with a dilute aqueous solution of HCl, and with distilled water, until a test shows that the mixture is neutral. The water and benzene are distilled off, and the product is recrystallized from an acetone-chloroform solution. There is obtained bi-[p-(1,1,3,3-tetramethylbutyl) phenyl]-4,4'-biphenyldicarboxylate, M.P. 189.5–191° C.

*Example 8*

Following the procedure of Example 7, biphenyl-2,2'-dicarboxylic chloride is employed as the halide reactant. Recrystallization is from a benzene-methanol solution. There is obtained bis-[p-(1,1,3,3-tetramethylbutyl)phenyl]-2,2'-biphenyldicarboxylate, M.P. 144–147° C.

The procedure described in Example 7 is repeated with phenols and dihalides hereinafter set forth. The molar proportions are as previously employed, and the biphenylcarboxylates are obtained as indicated.

*Example 9*

Phenol: 3-ethoxyphenol.
Halide: biphenyl-4,4'-dicarboxylic chloride.
Ester: bis(m-ethoxyphenyl)-4,4'-biphenyldicarboxylate.

*Example 10*

Phenol: 4-(1-ethyl-1-methylpentyl)phenol.
Halide: biphenyl-4,4'-dicarboxylic chloride.
Ester: bis-[p-(1-ethyl - 1 - methylpentyl)phenyl]-4,4'-biphenyldicarboxylate.

*Example 11*

Phenol: 3-dodecyloxyphenol.
Halide: biphenyl-3,3'-dicarboxylic chloride.
Ester: bis(m-dodecyloxyphenyl) - 3,3' - biphenyldicarboxylate.

*Example 12*

Phenol: 4-t-butylphenol.
Halide: biphenyl-2,2'-dicarboxylic chloride.
Ester: bis(p-t-butylphenyl)-2,2'-biphenyldicarboxylate.

*Example 13*

Phenol: 4-α-cumylphenol.
Halide: biphenyl-2,2'-dicarboxylic chloride.
Ester: bis(p-α-cumylphenyl)-2,2'-biphenyldicarboxylate.

*Example 14*

A mixture containing 14.48 grams (0.04 mol) of 5,5',6,6' - tetramethoxy - 3,3'-biphenyl dicarboxylic acid, 10 ml. of thionyl chloride, and 30 ml. of benzene is charged to a suitable flask and heated to reflux for about three hours. The mixture evolves hydrogen chloride and sulfur dioxide. The acid dissolves slowly, and the acid chloride precipitates. The latter is filtered off, and 7.0 grams (0.0175 mol) is added to 12.68 grams (0.035 mol) of m-octadecyloxyphenol in 60 ml. of benzene. After the addition, 6 ml. of triethylamine is heated to reflux for about one hour. The reaction mixture is then washed with a dilute aqueous solution of HCl, and with distilled water, after which it is evaporated to dryness. The product is recrystallized from ether to yield bis(m-octadecyloxyphenyl) - 5,5',6,6' - tetramethoxy - 3,3' - biphenyldicarboxylate.

*Example 15*

A mixture containing 83.3 ml. (0.05 mol) of a toluene solution of p-phenylbenzoyl chloride and 7.5 grams (0.05 mol) of 4-t-butylphenol is placed in a suitable flask. The mixture is agitated, and 0.052 mol of triethylamine is added slowly. The resulting mixture is heated to reflux and is held there for about one hour. The reaction mixture is then washed with a dilute aqueous solution of HCl, and with distilled water, until a test shows that said mixture is neutral. The water and toluene are distilled off, and the product is recrystallized from a chloroform-methanol solution. There is obtained an 85% yield of 4-t-butylphenyl p-phenylbenzoate, M.P. 144–145.5° C.

*Example 16*

Following the procedure of Example 15, 3-n-octadecyloxyphenol is employed as the phenol reactant. The product is recrystallized from an acetone-methanol solution, and there is obtained 3-n-octadecyloxyphenyl p-phenylbenzoate, M.P. 81–83° C.

Example 17

Following the procedure of Example 15, the reactants employed are m-phenylbenzoyl chloride and 4-α-cumylphenol. There is obtained 4-α-cumylphenyl m-phenylbenzoate.

Example 18

Following the procedure of Example 15, 4-(1,1,3,3-tetramethylbutyl)phenol is employed as the phenol reactant. The product is recrystallized from an acetone-methanol solution, and there is obtained 4-(1,1,3,3-tetramethylbutyl)phenyl p-phenylbenzoate.

Example 19

Following the procedure of Example 1, the reactants employed are p-phenylbenzoyl chloride and t-dodecylphenol in equimolar amounts. The product obtained is o-p-t-dodecylphenyl p-phenylbenzoate, $n_D^{25}=1.5624$.

It should be pointed out that the alkylphenols employed in preparing the compounds of this invention need not necessarily be pure para or meta compounds. It will be apparent that, during the alkylation of the phenols, some isomeric material will be formed. Although it is preferred to employ alkylphenols which comprise only the single desired isomer, the presence of relatively minor amounts of other isomers does not have any significant adverse effect. For example, the alkylphenols which are derived from propylene and butylene polymers (e.g., Example 1) can be employed with a para-to-ortho ratio of 4:1. When isomeric mixtures are used, it is preferred that the para-to-ortho ratio be at least about 6:1.

The biphenylcarboxylates of this invention have been found to be effective stabilizers for polymeric materials. Said esters are especially effective as ultraviolet light stabilizers for polyolefins such as polyethylene, polypropylene and the like. From the standpoint of optimum effectiveness, readily available starting materials and commercial practicality, a particularly preferred group of esters is characterized by the formula,

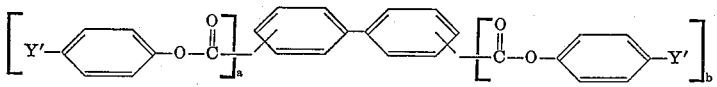

wherein:

*a* and *b* are integers from zero to one, and the sum of *a*+*b* is at least one; and Y' is alkyl of four to twenty-four carbon atoms, such alkyl being connected to the phenyl ring by a tertiary carbon atom.

As illustrative of the stabilizing action of the biphenylcarboxylates of this invention, polyethylene (average molecular weight of about 20,000) films (5 mils thick) containing 1% by weight of said esters exhibit remarkable stability to the degradative effects of ultraviolet light. For example, 5-mil films containing 1.0% concentration of the following esters:

(A) 4-t-butylphenyl p-phenylbenzoate,
(B) Bis[p-(1,1,3,3-tetramethylbutyl)phenyl]-4,4'-biphenyldicarboxylate,
(C) Bis(m-octadecyloxyphenyl)-5,5',6,6'-tetramethoxy-3,3'-biphenyldicarboxylate, were exposed to ultraviolet light in a specially designed apparatus. Said apparatus comprises a chamber having an exhaust fan mounted therein and having a number of spaced, air intake openings. A horizontal turntable is mounted in said chamber, and an artificial source of ultraviolet light is suspended above the center of the turntable. A plurality of vertical brackets is spaced around the perimeter of the turntable, and the films to be tested are attached to said brackets substantially in the plane of the ultraviolet source.

The test films and control films were exposed to the ultraviolet source at a distance of 5 inches. At the end of the exposure period, the films were analyzed for carbonyl content, which is a measure of degradation. Carbonyl content is determined by measurement of the infrared absorption in the 5.82 millimicron region and is expressed as mols $\times 10^4$ per liter. The results obtained are tabulated below.

| Additive | Hours Exposed | Carbonyl Content |
|---|---|---|
| None | 87 | 196 |
| Ester (A) | 87 | 171 |
| Ester (B) | 87 | 71 |
| None | 200 | 504 |
| Ester (A) | 200 | 284 |
| Ester (B) | 200 | 206 |
| None | 95 | 142 |
| Ester (C) | 95 | 138 |
| None | 200 | 470 |
| Ester (C) | 200 | 350 |

Similar results are obtained when the other biphenylcarboxylates of this invention are tested in the above manner.

The amount of the ester of this invention employed in any polymer composition can be varied widely, depending upon the particular polymer, the thickness of the polymer article, and the use for which the article is intended. Concentrations of the esters of from about 0.001% to 10% by weight of the polymer can be used, with concentrations of 0.1% to 3% being preferred.

The biphenylcarboxylates can be used in polymer compositions containing the common additives such as pigments, fillers, and heat stabilizers. They can also be used in combination with known light stabilizers.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A compound of the formula,

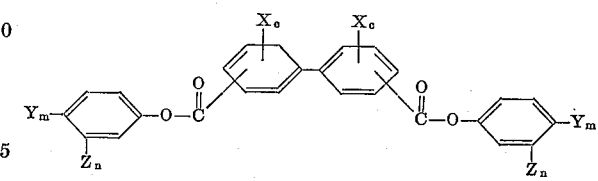

wherein:

*c* is an integer from zero to two;

*m* and *n* are unlike integers from zero to one;

X is selected from the group consisting of alkyl and alkoxy of one to four carbon atoms;

Y is selected from the group consisting of α-cumyl and

wherein:

R, $R_1$ and $R_2$ are each alkyl of one to twenty-one carbon atoms, and the sum of the carbon atoms in R, $R_1$, and $R_2$ is up to twenty-three; and Z is alkoxy of one to eighteen carbon atoms.

2. A compound of the formula,

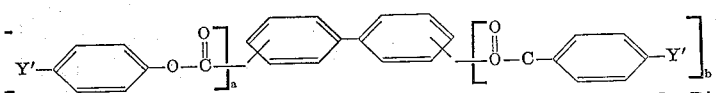

wherein:
 a and b are integers from zero to one, and the sum of $a+b$ is at least one; and
 Y' is alkyl of four to twenty-four carbon atoms, such alkyl being connected to the phenyl ring by a tertiary carbon atom.

3. Bis(p-nonylphenyl-4,4'-biphenyldicarboxylate.
4. Bis[p-(1,1,3,3-tetramethylbutyl)phenyl] - 4,4' - biphenylcarboxylate.
5. Bis[p-(1,1,3,3-tetramethylbutyl)phenyl] - 2,2' - biphenyldicarboxylate.
6. Bis(p-t-butylphenyl)-2,2'-biphenyldicarboxylate.
7. 4-t-butylphenyl p-phenylbenzoate.
8. Bis(m-octadecyloxyphenyl) - 5,5',6,6' - tetramethoxy-3,3'-biphenyldicarboxylate.
9. 3-n-octadecyloxyphenyl p-phenylbenzoate.

References Cited

UNITED STATES PATENTS 3,160,665  12/1964  Siegrist et al. _____ 260—469

RICHARD K. JACKSON, *Primary Examiner.*

LORRAINE A. WEINBERGER, *Examiner.*

T. L. GALLOWAY, *Assistant Examiner.*